United States Patent Office 3,682,876
Patented Aug. 8, 1972

3,682,876
POLYPERFLUOROCYCLOBUTADIENE
Richard W. Anderson and Hughie R. Frick, Midland, Mich., assignors to The Dow Chemical Company, Midland, Mich.
No Drawing. Filed Oct. 24, 1969, Ser. No. 869,338
Int. Cl. C08f 5/00
U.S. Cl. 260—91.5
17 Claims

ABSTRACT OF THE DISCLOSURE

Disclosed are halogen terminated polyperfluorocyclobutadienes characterized by the formula:

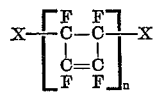

wherein X is halogen and $n$ is a number of greater than 1. The polymer is prepared by contacting a perfluoro-3,4-dihalocyclobutene, in which at least one of the halogens in the 3,4-position is bromine or iodine with mercury, in the presence of radiation of sufficient energy to activate the C—I or C—Br bond and cause coupling with another activated species.

---

The invention herein described was made in the course of or under a contract or subcontract thereunder with the Department of the Navy.

Polyperfluorocyclobutene is known. This polymer, characterized by the formula

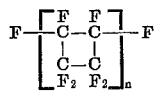

is normally prepared by the copolymerization of perfluorocyclobutene under elevated temperature and pressure. The polymerization is of the addition type resulting in a saturated polymer.

It is an object of the present invention to provide novel halogen terminated polyperfluorocyclobutadienes.

An additional object is to provide a novel process for the preparation of halogen terminated polyperfluorocyclobutadienes.

The halogen terminated polyperfluorocyclobutadienes of the present invention are characterized by the formula:

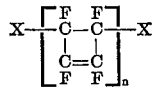

In the above formula, X is halogen and $n$ is a number greater than 1 representing the average degree of polymerization.

In general, the polymers are prepared by contacting a perfluoro-3,4-dihalocyclobutene characterized by the formula:

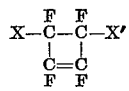

wherein X is halogen and X' is bromine or iodine with mercury in the presence of radiation of sufficient energy to activate the C—I or C—Br bonds and cause carbon to carbon coupling at these sites. Actinic radiation, i.e. light rays occurring in the visible and ultraviolet parts of the spectrum, are of sufficiently high energy for activation. Higher energy radiation such as X-rays and gamma rays may also be used for activation. When X is bromine or iodine, a high polymer is prepared. When X is chlorine or fluorine, the dimer results, i.e. the polymer has a degree of polymerization of 2.

The polymers of the present invention are prepared by a coupling type polymerization wherein halogens are cleaved and residual moieties coupled to yield an unsaturated polymer. They are referred to herein as polyperfluorocyclobutadienes due to the structure of the polymer which corresponds to a polymer as if prepared from a cyclobutadiene starting material by an addition polymerization at one of the double bonds.

The polymers of the present invention are useful in applications requiring thermal stability and chemical resistance. The double bonds provide potential crosslinking sites and increase the rigidity of the polymer. As a result, for a given degree of polymerization, the saturated polymers of the prior art referred to above may be liquid whereas the unsaturated polymer of the instant invention is a solid.

The solid polymers are useful in the preparation of thermally stable and chemically inert coatings, ablatives, gaskets, bearings, potting compounds and sealants. The lower molecular weight polymers (degree of polymerization of from 2 to about 5) are liquids having utility as thermally stable and chemically inert fluids. Additionally, the liquid polymers may be used as flotation fluids in gyroscopes due to their relatively high densities.

The preparation of the polymers may be carried out neat, i.e. solvent free; however, a solvent is normally employed when high molecular weight polymers are to be prepared. Suitable solvents are those organic liquids which are inert to the reactants and products and remain liquid under the reaction conditions. Additionally, the solvent should be inert to the radiation employed as catalyst to avoid competing reactions. Suitable solvents are, for example, 1,1,2-trichloro-1,2,2-trifluoro ethane (hereinafter referred to as chlorofluoroethane), perfluoro-1,2 - dichlorocyclobutene, 1,1,2,2 - tetrachloro - 1 - fluoro ethane, 1,2,2,2-tetrachloro-1-fluoro ethane or 1,1,2-trichloro-2,2-difluoro ethane.

The reaction is carried out at a temperature of from the freezing point of the system to about 250° C. with 50° to 150° C. being the preferred temperature range. Pressure is not critical; autogenous is preferred. The reactants are normally combined under an inert anhydrous atmosphere.

Perfluoro-3,4-diiodocyclobutene is the preferred starting material when a high degree of polymerization is desired. Perfluoro-3,4-iodobromocyclobutene and perfluoro-3,4-dibromocyclobutene will also polymerize; however, the rate and degree of polymerization is somewhat lower when these compositions are employed.

The mole ratio of perfluoro-3,4-dihalocyclobutene starting material to mercury should be at least about 1:1 for complete reaction. However, an excess of mercury increases the contact area and accelerates the reaction.

When perfluoro-3-iodocyclobutene or perfluoro-3-bromo-cyclobutene is reacted a perfluoro dimer is formed. In all other cases, the polymer is terminated by a halogen other than fluorine. The polymer can be end capped with fluorine by treating it with $COF_3$ at a temperature no greater than about 100° C. At temperatures greater than about 100° C., fluorine will add to the double bond resulting in saturation of the polymer. Treatment of the iodine or bromine terminated polymer with $SbCl_5$ or $ICl_3$ will produce a chlorine terminated composition.

By carefully controlling the reaction conditions, degrees of polymerization up to about 10,000 and higher can be obtained. In order to obtain high degrees of polymerization, vigorous stirring is necessary for fresh contact with the mercury. Increasing the amount of irradiation, as by using a quartz reaction vessel when ultra-violet light is employed and removing any buildup of polymer on its sides, as well as employing increased reaction times will increase the degree of polymerization. Polymers having degrees of polymerization of up to about 50 are readily prepared. In general, reaction times of from about 2 to 100 hours are employed depending upon the reaction temperature, solvent and degree of polymerization desired.

The following equations represent one method of preparing perfluoro-3,4-dihalocyclobutene starting materials:

(1) 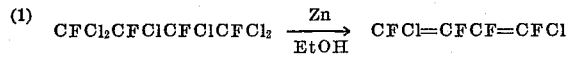

(2) 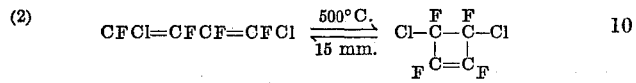

(3) 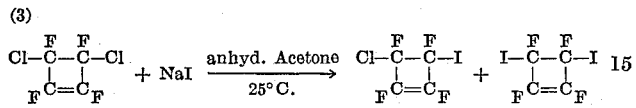

A perfluoro-3-halocyclobutene may be prepared as represented by the following equations:

(1) 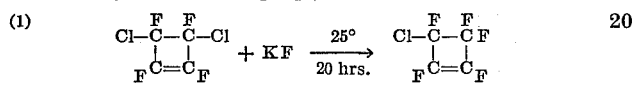

(2) 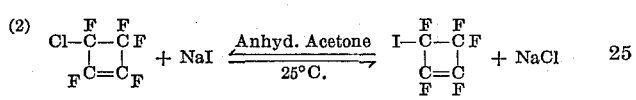

When it is desired to replace a chlorine atom with bromine rather than iodine, NaBr is used in place of NaI.

The invention is further illustrated by the following examples:

EXAMPLE I

Preparation of perfluorobi-2-cyclobutenyl

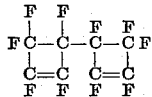

About 52.0 gm. (0.192 mole) of perfluoro-3-iodocyclobutene and 70 gm. (0.35 mole) of mercury were placed in a 12 oz. glass pressure vessel in a nitrogen filled dry box. The reactor was irradiated with ultraviolet light for 25 hours as the reaction mixture was stirred magnetically. The reactor and U.V. lamp were cooled to about 60° C. with an air stream during the reaction. About 24.2 gm. of perfluorobi-2-cyclobutenyl was recovered from the mixture by vacuum transfer into a cold trap. This represented an 88% yield based on perfluoro-3-iodocyclobutene as the limiting substance.

The assigned structure was confirmed by nuclear magnetic resonance. The results of elemental analysis of the product, which was a dense liquid having a boiling point of 82° C. are as follows:

|  | C | F |
| --- | --- | --- |
| Found, percent | 33.8 | 66.3 |
| Theory for $C_8F_{10}$ | 33.6 | 66.4 |

EXAMPLE II

Preparation of perfluoro-4,4'-dichlorobi-2-cyclobutenyl

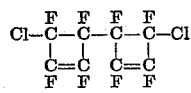

About 50 gm. (0.25 mole) of mercury and 14.0 gm. (0.049 mole) of perfluoro - 3-chloro-4-iodocyclobutene, and 15 ml. of chlorofluoroethane solvent were placed in a 6 oz. glass pressure vessel and the reactor irradiated with ultraviolet light over a period of 68 hours with air stream cooling and magnetic stirring as in Example I. The organic material was extracted from the mixture with additional chlorofluoroethane, and the extract filtered to remove any mercuric iodide. The filtrate was distilled and 4.3 gm. of the liquid product having a boiling range of from 139° to 140° C. and a density of 1.66 gm./cc. at 24° C. was recovered. This represented a 56% yield based on perfluoro-3-chloro-4-iodocyclobutene as the limiting reactant. Elemental analysis of the composition provided the following data:

|  | C | Cl | F |
| --- | --- | --- | --- |
| Found, percent | 30.4 | 22.3 | 47.7 |
| Theory for $C_8Cl_2F_8$ | 30.1 | 21.7 | 47.3 |

EXAMPLE III

Reaction of perfluoro-4,4'-dichlorobi-2-cyclobutenyl with anhydrous sodium iodide Exactly 2.5 gm. (0.0078 mole) of perfluoro-4,4'-dichlorobi-2-cyclobutenyl was placed in a 3 oz. glass pressure vessel containing 3.8 gm. (0.025 mole) of anhydrous sodium iodide and 25 ml. of anhydrous acetone. This reaction mixture was stirred at room temperature for 18 hours, and 3.2 gm. of crude product was obtained after washing the mixture with water. A 70% conversion to perfluoro-4-chloro-4'-iodobi-2-cyclobutenyl, an 18% conversion to liquid perfluoro-4,4'-diiodobi-2-cyclobutenyl, and a 98% yield, based on the organic starting material, was calculated from vapor phase chromatography data. The perfluoro - 4-chloro-4'-iodobi-2-cyclobutenyl was a liquid having a determined density of 2.03 gm./cc. at 24° C.

EXAMPLE IV

Polymerization of perfluoro-3,4-diiodocyclobutene

About 20.5 gm. (0.0542 mole) of perfluoro-3,4-diiodocyclobutene and 50 gm. (0.025 mole) of mercury were placed into a 12 oz. glass pressure vessel with 50 ml. of chlorofluoroethane. The reaction mixture was irradiated with ultraviolet light for 124 hours as the apparatus was cooled to about 60° C. with an air stream. At the end of the reaction period, the product was recovered by extracting the reaction mixture with chlorofluoroethane and the extract filtered to remove the bulk of the solids. Suspended and dissolved mercuric iodide were removed by washing the extract with aqueous potassium iodide and with water. About 6.6 gm. of pure solid polymer (83% of theory) was obtained. Elemental analysis indicated a degree of polymerization to be about 10 for this polymer, percent C, 34.9; percent F, 48.6; percent I, 17.3.

In a separate run, about 30.0 gm. (0.0795 mole) of perfluoro-3,4-diiodocyclobutene and 20 gm. (0.10 mole) of mercury were placed in the pressure vessel with 50 ml. of chlorofluoroethane. The reaction mixture was irradiated with ultraviolet light for 220 hours as the apparatus was cooled with an air stream. About 10.3 gm. of pure solid polymer (100% of theory) was recovered in a manner similar to that used for the recovery of the polymer having a degree of polymerization of 10. The result of elemental analysis, which indicated an average degree of polymerization of 40, is as follows:

|  | C | F | I |
| --- | --- | --- | --- |
| Found, percent | 36.8 | 57.4 | 5.0 |
| Theory for $C_{160}F_{160}I_2$ | 37.1 | 58.0 | 4.9 |

EXAMPLE V

End-capping polyperfluorocyclobutadiene with cobalt trifluoride at 100° C.

Exactly 1 gm. of the iodine terminated polyperfluorocyclobutadiene having a degree of polymerization of 10 prepared in Example IV, 19.4 gm. (0.017 mole) of cobalt trifluoride and 15 ml. of chlorofluoroethane solvent were placed into a 150 ml. stainless steel cylinder, and heated to 100° C. for 23 hours. The product was recovered by extracting the reaction mixture with chlorofluoroethane and filtering to remove the solids. Analysis for iodine showed 1.6% iodine remaining, indicating that 92% of the polymer end moieties were fluorinated. An infrared spectrum of the product did not indicate any fluorination of the double bonds.

In a manner similar to that of Example IV polyperfluorocyclobutadiene is prepared by the coupling of perfluoro-3,4-dibromo or perfluoro-3-bromo-4-iodo-cyclobutene. The terminal halogen atoms are replaced by fluorine in the manner described in Example V.

EXAMPLE VI

In a separate experiment, an attempt was made to prepare polyperfluorocyclobutadiene by a procedure illustrated by the following equation:

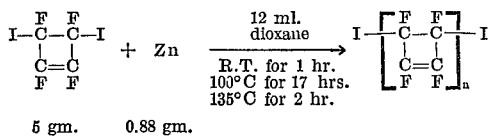

5 gm.   0.88 gm.

All ingredients were weighed and added to the reactor under an inert atmosphere. The only product recovered was 4.5 gm. of a high boiling liquid which gas chromatographic analysis indicated to be 99+% starting material. While there was a very small peak at the position indicative of perfluoro-4,4'-diiodobi-2-cycobutenyl, the experiment resulted in no reaction for all practical purposes.

We claim:
1. Polyperfluorocyclobutadienes characterized by the formula:

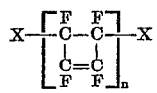

wherein X is halogen and $n$ is a number greater than 1.

2. The polyperfluorocyclobutadiene of claim 1 wherein the X substituents are bromine or iodine.

3. The polyperfluorocyclobutadiene of claim 1 wherein X is fluorine.

4. The polyperfluorocyclobutadiene of claim 1 wherein $n$ is 2 and X is chlorine.

5. The polyperfluorocyclobutadiene of claim 1 wherein $n$ is a number of from 2 to 10,000.

6. The polyperfluorocyclobutadiene of claim 1 wherein $n$ is a number of 2 to 50.

7. The polyperfluorocyclobutadiene of claim 1 wherein $n$ is a number of 50 to 10,000.

8. A process which comprises contacting a perfluoro-3,4-dihalocyclobutene characterized by the formula:

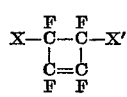

wherein X is halogen and X' is bromine or iodine with mercury in the presence of radiation of sufficient energy to activate the C—I or C—Br bond and cause carbon to carbon coupling of residual moieties to form a polyperfluoro-cyclobutadiene characterized by the formula:

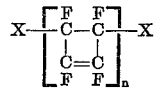

wherein X is halogen and $n$ is a number greater than 1.

9. The process of claim 8 wherein the reaction is carried out at a temperature from the freezing point of the system to a maximum of about 250° C.

10. The process of claim 8 wherein the radiation is in the form of actinic radiation.

11. The process of claim 8 wherein the radiation is in the form of ultraviolet radiation.

12. The process of claim 8 wherein the perfluoro-3,4-dihalocyclobutene is perfluoro-3,4-diiodocyclobutene.

13. The process of claim 8 wherein the perfluoro-3,4-dihalocyclobutene is perfluoro-3,4-dibromocyclobutene or perfluoro-3-iodo-4-bromocyclobutene.

14. The process of claim 8 wherein the molar ratio of mercury to the perfluoro-3,4-dihalocyclobutene is at least 1:1.

15. The process of claim 8 wherein the reaction is carried out at a temperature of from 50° to 150° C.

16. The process of claim 8 wherein the reaction is carried out in a solvent selected from those organic liquids which are inert to the reactants and products, remain liquid under the reaction conditions and are inert to the radiation employed in the process.

17. The process of claim 16 wherein the desired product is recovered from the reaction mixture.

References Cited

UNITED STATES PATENTS

| | | | |
|---|---|---|---|
| 2,436,142 | 2/1948 | Harmon | 260—91.5 |
| 2,837,505 | 6/1958 | Dittman et al. | 260—91.5 |
| 3,058,966 | 10/1962 | Seelbach et al. | 260—91.5 |
| 2,838,479 | 6/1958 | Biletch | 260—89.5 R |
| 3,022,277 | 2/1962 | Nelson | 260—89.5 R |
| 3,133,907 | 5/1964 | Voltz et al. | 260—93.1 |
| 3,389,112 | 6/1968 | Nordstrom | 260—89.5 R |
| 3,498,961 | 3/1970 | Tazuma | 260—93.1 |

HARRY WONG, JR., Primary Examiner

U.S. Cl. X.R.

204—159.22; 260—648 F